United States Patent
Chew (10) Patent No.: US 9,378,163 B2
(45) Date of Patent: Jun. 28, 2016

(54) METHOD TO ACCELERATE MESSAGE SIGNALED INTERRUPT PROCESSING

(75) Inventor: Yen Hsiang Chew, Georgetown (MY)

(73) Assignee: Intel Corporation, Santa Clara, CA (US)

(*) Notice: Subject to any disclaimer, the term of this patent is extended or adjusted under 35 U.S.C. 154(b) by 437 days.

(21) Appl. No.: 13/976,213

(22) PCT Filed: Nov. 3, 2011

(86) PCT No.: PCT/US2011/059182
§ 371 (c)(1),
(2), (4) Date: Jun. 26, 2013

(87) PCT Pub. No.: WO2013/109234
PCT Pub. Date: Jul. 25, 2013

(65) Prior Publication Data
US 2014/0189182 A1    Jul. 3, 2014

(51) Int. Cl.
*G06F 13/24* (2006.01)
*G06F 9/48* (2006.01)

(52) U.S. Cl.
CPC .............. *G06F 13/24* (2013.01); *G06F 9/4812* (2013.01); *G06F 2213/2418* (2013.01)

(58) Field of Classification Search
CPC   G06F 13/24; G06F 9/4812; G06F 2213/2418
USPC .......................................................... 710/269
See application file for complete search history.

(56) References Cited

U.S. PATENT DOCUMENTS

| | | | |
|---|---|---|---|
| 6,941,398 B2* | 9/2005 | Lai | G06F 13/24 710/260 |
| 8,762,595 B1* | 6/2014 | Muller | G06F 13/14 710/22 |
| 2003/0182484 A1 | 9/2003 | Gaur et al. | |
| 2004/0221066 A1 | 11/2004 | Ganfield et al. | |
| 2006/0047877 A1 | 3/2006 | Winkler et al. | |
| 2006/0259658 A1 | 11/2006 | Connor et al. | |
| 2007/0005858 A1 | 1/2007 | Shah et al. | |
| 2008/0215787 A1* | 9/2008 | Mizrachi | G06F 13/24 710/260 |
| 2013/0275639 A1* | 10/2013 | Chew | G06F 13/24 710/269 |

FOREIGN PATENT DOCUMENTS

CN         101176076 A      5/2008

OTHER PUBLICATIONS

Taiwan Patent Application No. 101140537, Office Action, Mailed Nov. 4, 2014.

(Continued)

*Primary Examiner* — Glenn A Auve
(74) *Attorney, Agent, or Firm* — Nicholson De Vos Webster & Elliott LLP (57) ABSTRACT

Methods to accelerate a message signaled interrupt (MSI) are described herein. An embodiment of the invention includes an interrupt controller to receive a messaged signaled interrupt (MSI) request from a device over a bus, and an execution unit coupled to the interrupt controller to execute an interrupt service routine (ISR) associated with the device, the execution unit to retrieve interrupt data from a predetermined memory location specifically allocated to the device and to service the MSI using the interrupt data, without having to obtain the device interrupt data via an input output (IO) transaction.

20 Claims, 8 Drawing Sheets

(56) References Cited

OTHER PUBLICATIONS

PCT International Search Report for PCT Counterpart Application No. PCT/US2011/059182, 3 pgs., (Aug. 21, 2013).

PCT Written Opinion of the International Searching Authority for PCT Counterpart Application No. PCT/US2011/059182, 5 pgs., (Aug. 21, 2013).

PCT Notification concerning Transmittal of International Preliminary Report on Patentability (Chapter I of the Patent Cooperation Treaty) for PCT Counterpart Application No. PCT/US2011/059182, 7 pgs., (May 15, 2014).

* cited by examiner

METHOD TO ACCELERATE MESSAGE SIGNALED INTERRUPT PROCESSING

CROSS-REFERENCE TO RELATED APPLICATION

This patent application is a U.S. National Phase Application under 35 U.S.C. §371 of International Application No. PCT/US2011/059182, filed Nov. 3, 2011, entitled METHOD TO ACCELERATE MESSAGE SIGNALED INTERRUPT PROCESSING.

FIELD OF THE INVENTION

Embodiments of the present invention relate generally to data processing systems. More particularly, embodiments of the invention relate to acceleration of message signaled interrupt (MSI) processing.

BACKGROUND

Message signaled interrupts (MSI) are a feature that enables a device function to request service by writing a system-specified data value to a system-specified address using, for example, a memory write transaction. An MSI transaction enables a device function to request an interrupt service by sending the MSI transaction as an inbound memory write on its bus to the front-side bus (FSB). Because an MSI transaction is generated in the form of a memory write, MSI transactions support transaction conditions such as a retry, master-abort, target-abort or normal completion. As added benefits, MSI transactions simplify board design by removing out of band interrupt routing and represent another step towards a legacy-free environment.

Message signaled interrupts allow a device to write a small amount of data to a special address in memory space. The chipset will deliver the corresponding interrupt to a processor (also referred to as a central processing unit or CPU). A common misconception with message signaled interrupts is that they allow the device to send data to the CPU as part of the interrupt. The data that is sent as part of the write is used by the chipset to determine which interrupt to trigger on which CPU; it is not available for the device to communicate additional information to the interrupt handler.

A drawback of MSI transactions is the latency involved with servicing an interrupt. For example, when a device requests an interrupt service using MSI, the device generates a MSI transaction including a system-specified message and a system-specified address. Once a processor receives the MSI transaction, the processor has to communicate with the requesting device to retrieve data required to service the interrupt. The processor may then service the interrupt using interrupt data received from the device. However, the latency involved with communications with the device may be relatively long. As a result, each interrupt serviced via a MSI transaction involves a long latency and adds traffic to, for example, the FSB, the memory controller hub (MCH), and/or, the input-output controller hub (ICH) coupling the device to the processor.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a mechanism is provided to allow a device to bundle and send interrupt data or messages to processor directly when asserting an MSI interrupt to the processor for effective and accelerated interrupt handling. According to one embodiment, for each device that is capable of handling MSI interrupts, a specific block of memory is allocated for the device. Such a block of memory may be allocated from a processor cache (e.g., processor level-3 or L3 cache) or from a specific memory region of a system memory coupled to the processor. Each device is able to directly access its associated block of memory, for example, via a posted write transaction (e.g., using direct cache access techniques). The size of a memory block associated with a device may vary dependent upon the specific configuration or needs, which may be configurable during an initialization of the system or device.

According to one embodiment, when a device is about to assert an MSI, the device is configured to store all the necessary data (also referred to herein as interrupt data) to be utilized during the interrupt service to the associated memory block via a first posted write transaction. The device then is configured to request the MSI via a second posted write transaction to the system specifically defined address for the MSI to trigger the MSI interrupt. When the processor invokes an interrupt service routine (ISR) associated with the device, the processor can access the memory block specifically allocated to the device to retrieve the interrupt data and service the interrupt using the interrupt data without having to access the device for the same data via one or more IO transactions, which may take a relatively long period of time.

Figure 1:
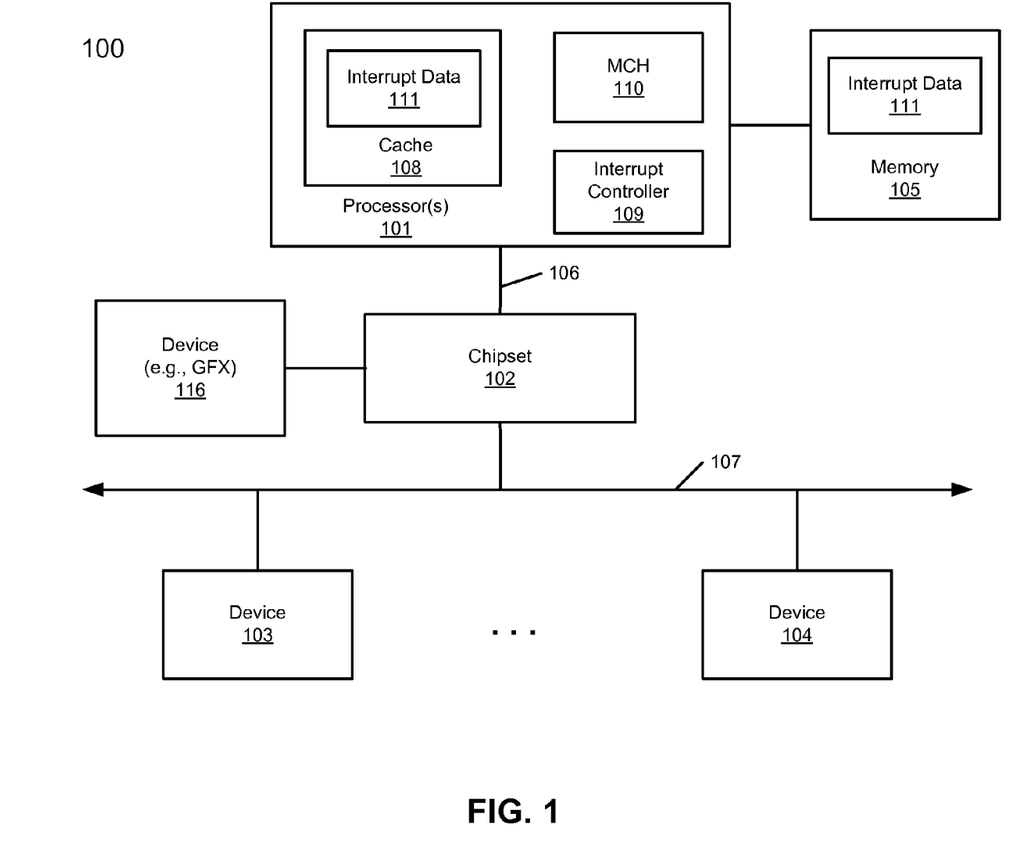
FIG. 1 is a block diagram illustrating an example of a system having improved MSI interrupt handling according to one embodiment.

FIG. 1 is a block diagram illustrating an example of a system having improved MSI interrupt handling according to one embodiment. Referring to FIG. 1, system 100 includes, but is not limited to, processor 101 coupled to chipset 102 via processor bus 106 (also referred to as a front side bus or FSB), where chipset 102 is coupled to one or more devices 103-104 via an IO bus or interconnect 107. Processor 101 may represent single or multiple processors with single or multiple processor cores. Processor 101 further includes MCH 110 to enable processor 101 or other devices such as devices 103-104 accessing memory 105 over a memory bus or interconnect. In one embodiment, processor 101 includes processor cache 108 having certain cache lines specifically allocated to devices 103-104 to store interrupt data 111. When interrupt controller 109 (also referred to as an interrupt handler) is to invoke an execution unit (not shown) of processor 101 to handle an interrupt such an MSI interrupt requested from a device, the execution unit can directly access the corresponding block of cache 108 associated with the device to retrieve interrupt data 111 of the device for the purpose of servicing the MSI interrupt, without having to obtain the same data from the device via one or more IO transactions (e.g., via chipset 102 and buses 106-107).

According to one embodiment, when a device such as device 103 or device 104 is about to assert an MSI, the device is configured to store interrupt data 111 to be utilized during the interrupt service to the associated block of cache 108 via a first posted write transaction. The device then requests the MSI via a second posted write transaction to the system specifically defined address for the MSI to trigger the MSI interrupt. When processor 101 invokes an interrupt service routine (ISR) associated with the device, processor 101 can access interrupt data 111 associated with the device and service the interrupt using the interrupt data without having to access the device for the same data via one or more IO transactions.

Figure 3:
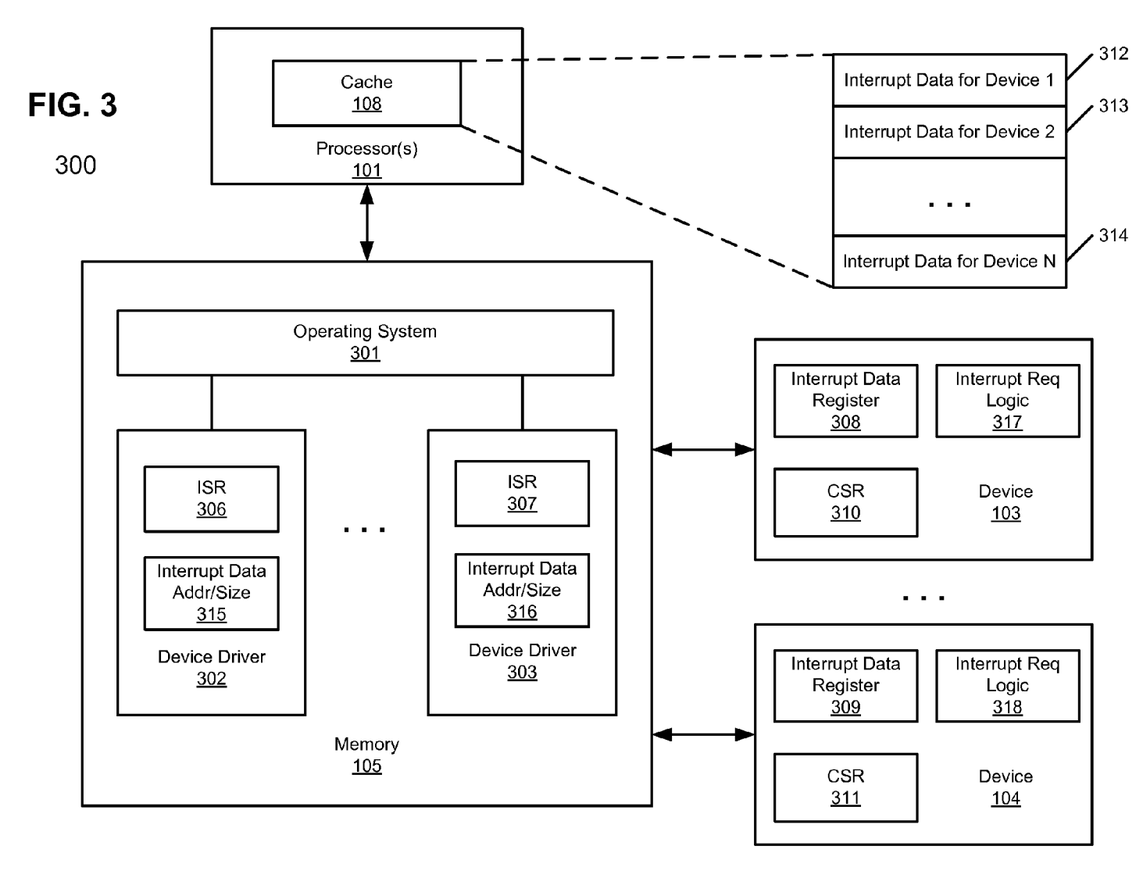
FIG. 3 is a block diagram illustrating an example of architecture of a data processing system according to one embodiment.

One of the reasons for specific cache lines to be allocated is to prevent interrupt data written to these allocated cache lines from being automatically replaced by the cache line replacement algorithm (e.g. least recently used (LRU) cache line replacement policy). For example, device 103 pushes interrupt data into cache line 312 followed by an MSI interrupt. Processor 101 branches to device 103's ISR 306 and executes the ISR's callback function. When processor 101 services the interrupt (assuming that processor core 1 is servicing the interrupt). Meanwhile, a second process from another processing core (core 2) accesses data from system memory 105 and encounters a cache miss, which causes the interrupt data contents of cache line 312 to be automatically replaced by data in system memory 105. This will cause ISR 306 to access the no longer valid interrupt data from cache line 312 and compromise the whole system. In one embodiment, the allocated cache line is allocated by marking it unavailable for automatic replacement and it is allocated to a device (e.g. device 103) by writing its cache line or memory address into device 103's interrupt data register 308, such that device 103 is the only device that can write to that cache line.

Figure 2:
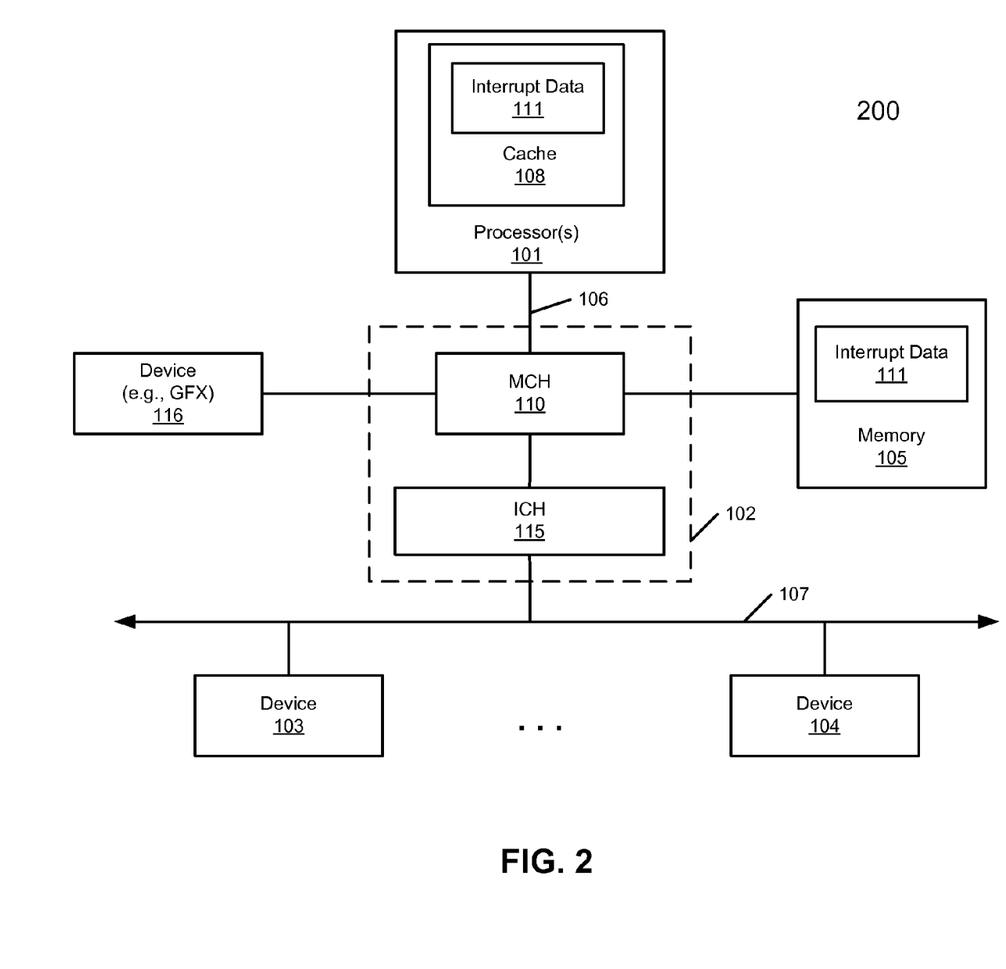
FIG. 2 is a block diagram illustrating an example of a system having improved MSI interrupt handling according to an alternative embodiment.

Note that the configuration as shown in FIG. 1 is described for the purpose of illustration only. The memory blocks allocated to store interrupt data 111 for devices 103-104 can also be allocated from other memories such as system memory 105 and accessible by processor 101 via MCH 110. Also note that MCH 110 may be integrated with chipset 102, where chipset 102 further includes input output controller hub (ICH) 115 to control IO devices such as devices 103-104, as shown in FIG. 2.

FIG. 3 is a block diagram illustrating an example of architecture of a data processing system according to one embodiment. System 300 may be implemented as a part of system 100 as shown in FIG. 1 or system 200 of FIG. 2. Referring to FIG. 3, system 300 includes various software components executed from memory 105 by processor 101 including, but are not limited to, operating system (OS) 301 and device drivers 302-303 for operating devices 103-104, respectively. OS 301 can be a variety of operating systems, such as Windows® from Microsoft, Mac OS®/iOS® from Apple, Android® from Google®, Linux® or Unix® operating system. OS 301 is configured to communicate with devices 103-104 via their respective device drivers 302-303 over a bus or interconnect.

When a device (e.g., device 103) wishes to request an MSI interrupt, the device is configured to issue a posted write transaction to a system defined address for MSI, including an interrupt vector representing an entry point of the associated ISR. The MSI request causes an interrupt controller to invoke processor 101 to call back the ISR (e.g., ISR 306) to service the interrupt. Conventionally, when the ISR is invoked, the processor has to access the corresponding device to retrieve the necessary interrupt data such as data of one or more control and status register (CSR) of the device via one or more IO transactions, which may consume a relatively long period of time.

According to one embodiment, for each of devices 103-104, a dedicated block of memory is allocated to store interrupt data to be utilized by the corresponding ISR when an MSI interrupt is serviced by processor 101. The memory block can be allocated from processor cache 108 or alternatively from a specific region of the system memory such as memory 105. Such memory blocks can be allocated during an initialization of system 300 (e.g., boot) or during initialization of device drivers 302-303. Alternatively, a memory block may be dynamically allocated when a device is connected with the system (e.g., detected by a plug-and-play manager).

For example, according to one embodiment, during initial enumeration of devices, the system firmware such as a basic input output system (BIOS) or a low level OS initialization component can allocate and assign a block of memory to each device. For example, the system may directly configure or write a particular cache line address and/or size, or memory address and/or size associated with the corresponding memory block of each device in a predetermined register of the device (e.g., registers 308-309). The system may allocate a fixed size memory block for each device such as memory blocks 312-314. For example, during system initialization, the system may allocate and write a memory address and/or size of the allocated block to a predetermined register such as interrupt data registers 308-309 of devices 103-104, respectively.

Subsequently, when device drivers 302-303 are loaded and initialized by OS 301, each of devices 103-104 can retrieve the cache line address or memory address from its interrupt data register (e.g., registers 308-309) and directly access the associated memory block (e.g., memory blocks 312-314) for the purpose of storing the interrupt data, for example, via a direct cache access (DCA) or direct memory access (DMA) method when it wants to send an MSI interrupt to processor 101. Similarly, during system initialization, OS 301 may also write the same memory address and/or size of the allocated memory block previously allocated to device 102-103 to a device driver 302-303 interrupt data parameter (e.g., interrupt data address/size 315-316) for the purpose of accessing device interrupt data from the same memory block during ISR interrupt service processing.

In a particular embodiment, during initialization, OS 301 allocates cache line 312 and writes the memory addresses to both the device driver interrupt data register 308 and also a device driver interrupt data parameter (e.g. interrupt data address/size 315-316). When device 103 wishes to interrupt processor 101. It proactively sends its interrupt data as a posted write transaction into cache line 312 via DCA using the memory address previously stored in its interrupt data register 308 followed by an MSI interrupt posted write. The MSI interrupt will trigger processor 101 to branch to device driver's ISR 306. Inside ISR 306. Processor 101 then obtains device 103's interrupt data using the cache line address pointed to by device driver interrupt data parameter 315 and uses the interrupt data to process the interrupt. Storing the same cache line or memory address to both device data register 308 and an interrupt data parameter 315 inside device driver 302 during initialization enables device 103 and processor 101 executing device driver 302 (e.g., two separate entities) to know where to send and retrieve interrupt data without having to query each other.

Alternatively, according to another embodiment, when a device driver is loaded and initialized by OS 301, the device is configured to communicate with OS 301 or the BIOS to request a block of memory (from processor cache or system memory) with a particular size. For example, a device driver can call a specific an application programming interface (API) to BIOS or OS 301 to negotiate a block of memory either from processor cache 108 or system memory 105. In return, the system allocates and provides a starting memory address and/or size to the device driver, which may be maintained (in memory 105) by the device driver throughout the life of the device driver or alternatively, it can be written in a register of the device (e.g., interrupt data registers 308-309). As a result, each device driver has the capability of negotiating various sizes of memory blocks for storing interrupt data, which is not limited to traditional MSI request messages.

For the purpose of illustration only, it is assumed that device driver 302 is configured to control and operate device 103 and memory block 312 has been allocated to device 103 for storing interrupt data. When an interrupt event of device 103 occurs, device 103 is configured to store the associated interrupt data to memory block 312. Note that an interrupt requester of a driver is invoked only once during device configuration to reserve (request for) an MSI interrupt, which may include setting up the interrupt vector and linking it to the interrupt service routine callback function of the device and reserving a memory block for storing interrupt data. The device is the one that contains additional logic, firmware or software to proactively push its interrupt data including its own CSR values, filled DMA buffer addresses, device messages, tags and other information to processor cache or memory when it wishes to send an MSI interrupt to processor. When this is done, device driver 302's interrupt service routine no longer needs to poll the device for its interrupt data using multiple IO transactions. For example, when device 103 wishes to assert an MSI interrupt to processor 101, interrupt request logic 317, which may be implemented as a DCA/DMA logic or firmware, proactively pushes interrupt data of device 103 (e.g. CSR 310, DMA filled buffer addresses, interrupt messages, tags . . . ) into memory block 312 as a first posted write transaction before sending an MSI interrupt as the second posted write transaction.

Once the interrupt data has been stored in memory block 312, logic 317 of device 103 will send an MSI interrupt, for example, by issuing a posted write transaction, to a system defined address specifically for MSI interrupt. In response to the MSI request, an interrupt controller such as interrupt controller 109 of FIG. 1 causes processor 101 to branch to its interrupt handler and calls ISR 306 of device driver 302. When ISR 306 is invoked, processor 101 is configured to access memory block 312 to retrieve the interrupt data stored therein based on the memory address associated with the allocated memory block and to service the MSI interrupt using the retrieved interrupt data without having to access device 103 via one or more IO transactions.

Note that the interrupt controller (e.g. processor APIC—Advanced Programmable Interrupt Controller) processes the interrupt vector associated with the MSI interrupt and causes processor 101 to branch to its interrupt handler. The interrupt handler will invoke ISR 306. An MSI interrupt is sent by a device to a system defined address of processor and contains one interrupt vector. Each device's MSI interrupt contains a unique interrupt vector that is mapped to the device ISR. When processor 101 detects that a posted write transaction is to the system defined address, it passes the posted write transaction data (e.g., the interrupt vector) to the processor APIC. The processor APIC uses the interrupt vector to locate the interrupt handler which may reside in some specified memory address. The interrupt handler then invokes the device driver's ISR 306 callback function to service the interrupt. In this embodiment, ISR 306 obtains its interrupt data from memory 312 without having to poll device 103 using multiple IO transactions.

According to one embodiment, when device 103 wishes to request an MSI interrupt, logic 317 of device 103 is configured to issue a first posted write transaction to a preconfigured memory address corresponding to memory block 312 to a bus (e.g., IO bus and/or FSB) with all the necessary interrupt data included therein. The memory address may be retrieved from interrupt data register 308 and also maintained by device driver 302. Once the interrupt data has been stored in memory block 312, device 103 is configured to issue a second posted write transaction to a system defined address for requesting an MSI interrupt, which will be received by an interrupt controller that may reside within processor 101 or within a chipset coupling device 103 and processor 101. In one embodiment, the first and second posted write transactions may be issued as back-to-back transactions. In one embodiment, prior to issuing the first posted write transaction, interrupt request logic 317 may acquire an exclusive bus access by locking down a bus coupling device 103 with processor 101 and to release the exclusive access after the second posted write transaction has been issued.

Since both transactions are treated as posted writes and the bus (e.g., backbone bus such as FSB and/or IO bus) is locked, producer consumer rules guarantee that data write transaction and MSI interrupt transaction will be delivered to processor 101 in a correct order, without interference from other components. Upon receiving the MSI interrupt via the second posted write transaction, processor 101 branches to ISR 306. While executing ISR 306, processor 101 is configured to access memory block 312 to retrieve interrupt data such as CSR information corresponding to CSR register 310, device specific messages, and other information as needed. Based on the information, processor 101 can determine the type of interrupt services requested by device 103, the state of device 103, and/or the statues of device 103; and service the requested interrupt using the retrieved interrupt data accordingly. After servicing the interrupt, processor 101 may update certain registers of device 103 via one or more IO or memory mapped IO transactions, notifying device 103 that the interrupt has been serviced.

Figure 4:
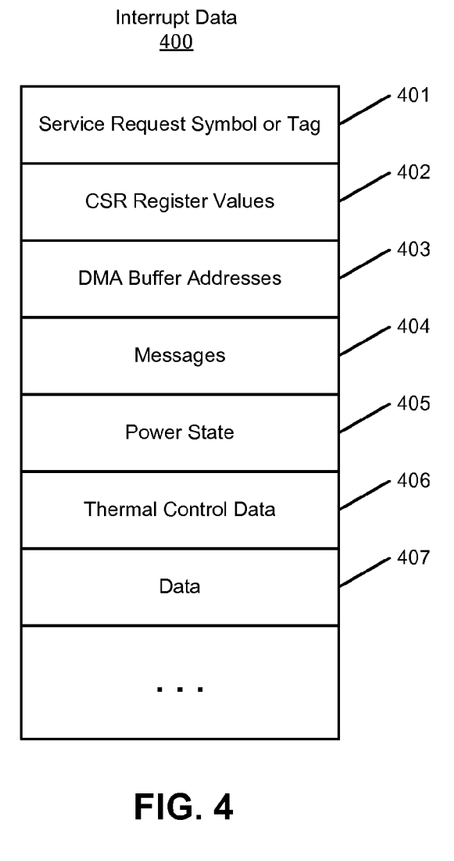
FIG. 4 is a block diagram illustrating a data structure to store interrupt data according to one embodiment.

Dependent upon the size of an allocated memory block, according to one embodiment, interrupt data can include a variety of information that can be utilized by ISR 306 when servicing the MSI interrupt. For example, as shown in FIG. 4, interrupt data 400 may include, but is not limited to, service request symbol or tag 401, CSR register value 402, direct memory access (DMA) addresses 403, device specific messages 404, and other data 405. Service request symbol or tag 401 may be utilized by an ISR to determine the type of service or function should be performed during the interrupt service (e.g., a filled DMA buffer to be processed; an error condition occurred and error recovery is needed; data available to be processed; or device ready to receive data, etc). Service request symbol or tag 401 may be internally defined by a device logic developer and/or device software developer specifically tailored to the device's needs. CSR register values 402 may be retrieved from one or more CSR register of the device and posted via the first posted write transaction. Note that information 401-407 is shown for the purpose of illustration only; more or less of information 401-407 may be included dependent upon the specific configuration.

For example, interrupt data 400 may further include any device register values, first-in-first-out (FIFO) entries, queue entries, or any other device information can may otherwise be obtained using one or more IO transactions to query device registers during an ISR callback (after MSI interrupt has been received and processor execution has entered the ISR). Device power state information 405 may allow the device to proactively interrupt processor in response to a change in its power state or in response to a power state transition event. Device thermal and thermal control information 406 may allow the device to proactively interrupt processor in response to a thermal event such as overheating or the need to turn on/turn off a fan or a cooling system. Other data information 407 may include some relatively "small size" interrupt data, such as keystrokes and/or coordinates information from a user input device such as a mouse, touchpad or keyboard, etc.

Figure 5:
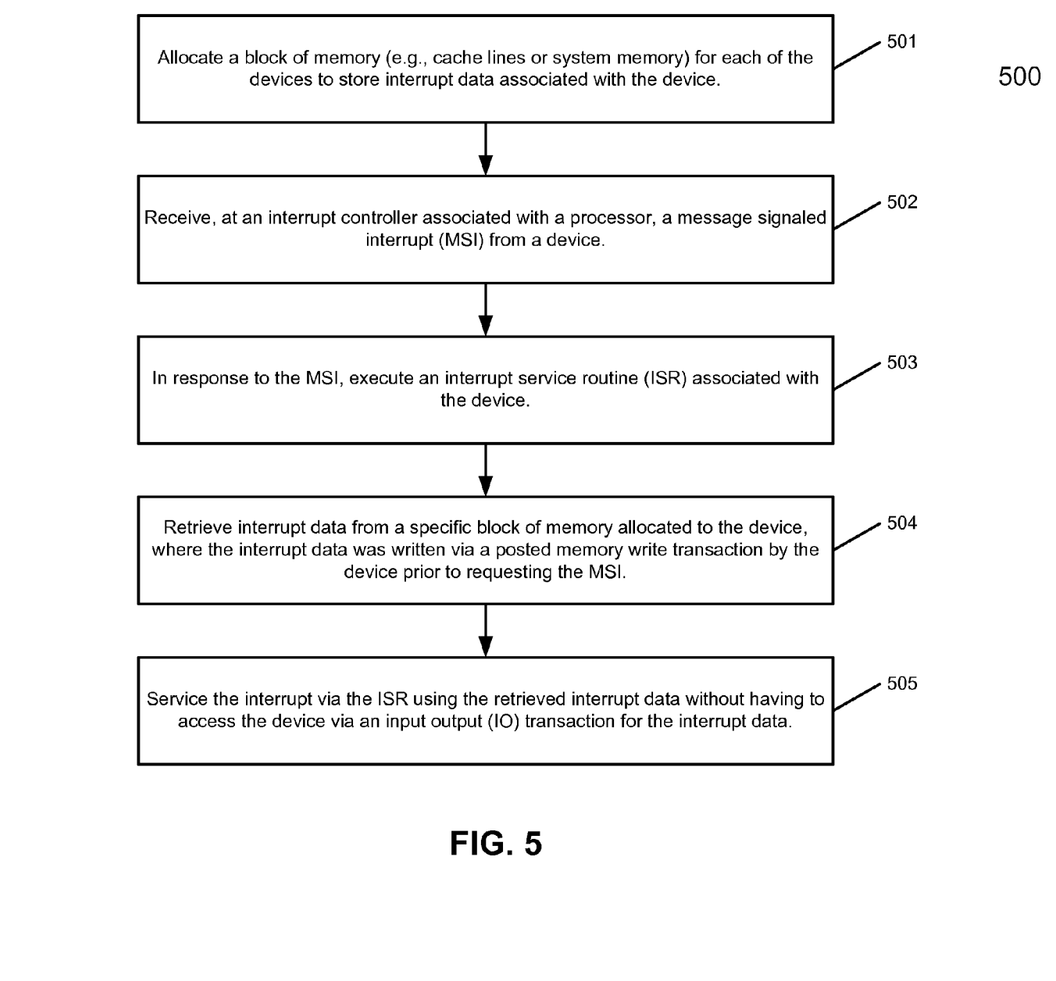
FIG. 5 is a flow diagram illustrating a method to accelerate MSI interrupt processing according to one embodiment.

FIG. 5 is a flow diagram illustrating a method to accelerate MSI interrupt processing according to one embodiment. Method 500 may be performed by system 100 or 200 as described above. Referring to FIG. 5, at block 501, processing logic allocates a block of memory (e.g., processor cache lines or system memory) for each of the devices to store interrupt data associated the device. The interrupt data may be stored by a device in its associated memory block via a first posted write transaction (e.g., first back-to-back posted write transaction). At block 502, processing logic such as interrupt controller receives an MSI request from a device. The MSI request may be received from the device via a second posted write transaction (e.g., second back-to-back posted write transaction). In response to the MSI request, at block 503, an ISR associated with the device is executed by the processor. The ISR may be invoked based on an interrupt vector received via the MSI request (e.g., the second back-to-back posted write transaction). At block 504, interrupt data is retrieved from the memory block that is associated with the device, where the interrupt data may be stored in the memory block via the first back-to-back posted write transaction. In one embodiment, the interrupt data may be stored based on a cache line address stored in a device driver interrupt data parameter entry (e.g., interrupt data address/size 315-316). At block 505, the interrupt data is utilized to service the MSI interrupt without having to communicate with the device for the same data via an IO transaction.

Figure 6:
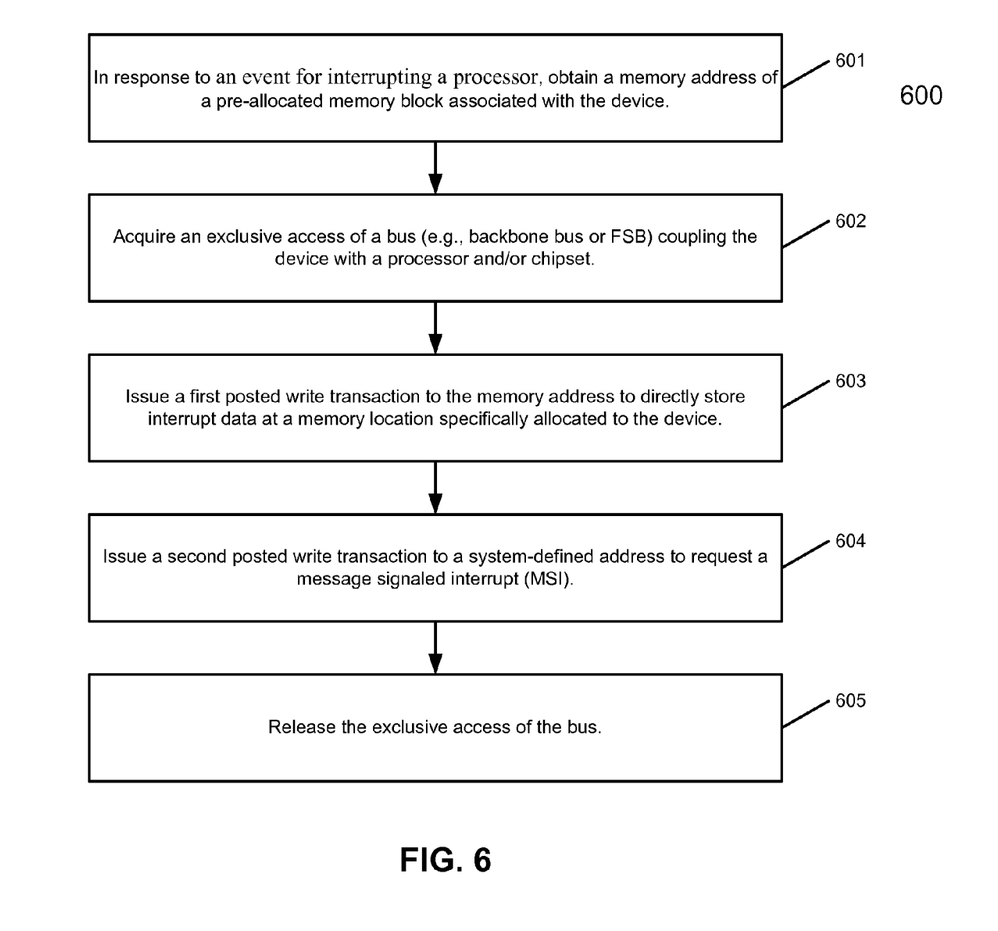
FIG. 6 is a flow diagram illustrating a method to accelerate MSI interrupt processing according to another embodiment.

FIG. 6 is a flow diagram illustrating a method to accelerate MSI interrupt processing according to another embodiment. Method 600 may be performed by a device such as device drivers 103-104 of FIG. 3. Referring to FIG. 6, at block 601, in response to an event for interrupting a processor, obtain a memory address of a pre-allocated memory block associated with the device. The memory block may be allocated from a processor cache of a processor or from the system memory, for example, during initialization of the system and/or the device. The memory address may be obtained from a predetermined register of the device, where the memory address was stored in the register previously (e.g., during initialization such as enumeration of the bus or devices). At block 602, processing logic acquires an exclusive access (e.g., lock) of a bus or interconnection coupling the device with the processor and/or chipset. At block 603, processing logic issues a first posted write transaction to the memory address to directly store interrupt data (e.g., interrupt data 400 of FIG. 4) at a memory location specifically allocated to the device. Once the interrupt data has been stored in the dedicated memory location, at block 604, processing logic issues a second posted write transaction to a system defined address to request an MSI interrupt. The first and second posted write transactions may be back-to-back transaction while the bus or interconnection is locked. Thereafter, at block 605, the exclusive access of the bus or interconnection is released.

It can be seen that embodiments of the invention enable a device to proactively push certain information such as its CSR register values and other data into processor's cache or certain regions of the system memory when interrupting the processor for service using a coalesced bus write transaction. The processor can have fast access to information it needs to service the interrupt and does not have to poll a register of the device via an IO transaction which can be inefficient and time consuming. It can also be seen that devices may selectively push only subsets of information needed by the processor to service the interrupt, for example, as shown in FIG. 4. It will be appreciated that a device designer may choose to use conventional methods of servicing an MSI interrupt, an improved MSI method as described above, or a combination of both methods. The choices of MSI processing methods may be selected dependent upon the complexity of the devices and/or the bandwidth or processing power available at the point in time (e.g., whether it is more efficient to "push" instead of "poll" under the circumstances).

Figure 7:
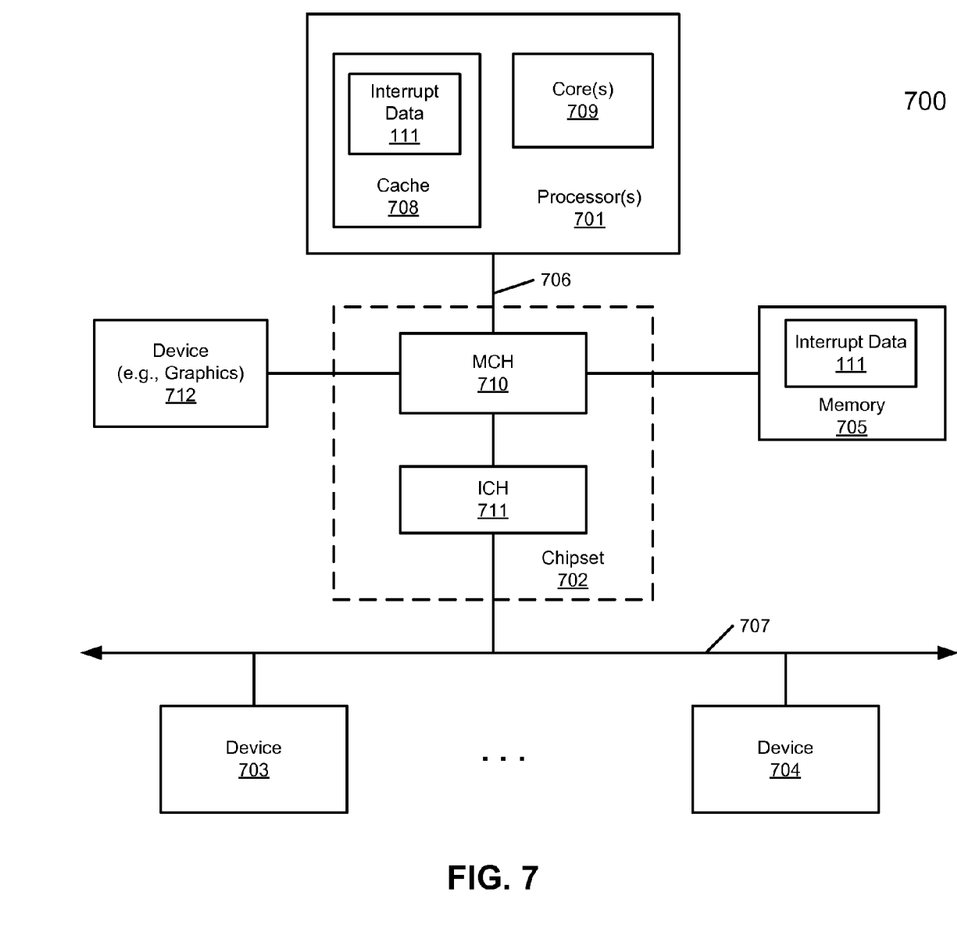
FIG. 7 is a block diagram illustrating an example of a data processing system according to one embodiment.

FIG. 7 is a block diagram illustrating an example of a data processing system according to one embodiment of the invention. For example, system 700 may represent any of systems 100 and 200 of FIGS. 1 and 2. System 700 may represent a desktop, a laptop, a tablet, a server, a mobile phone (e.g., Smartphone), a media player, a personal digital assistant (PDA), a personal communicator, a gaming device, a network router or hub, a wireless access point or repeater, a set-top box, or a combination thereof. Note that while FIG. 7 illustrates various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the present invention.

Referring to FIG. 7, in one embodiment, system 700 includes processor 701 and chipset 702 to couple various components to processor 701 including memory 705 and devices 703-704 via a bus or an interconnect. Processor 701 may represent a single processor or multiple processors with a single processor core or multiple processor cores 709 included therein. Processor 701 may represent one or more general-purpose processors such as a microprocessor, a central processing unit (CPU), or the like. More particularly, processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 701 may also be one or more special-purpose processors such as an application specific integrated circuit (ASIC), a field programmable gate array (FPGA), a digital signal processor (DSP), a network processor, a graphics processor, or the like. For example, processor 701 may be a Pentium™ 4, Pentium™ Dual-Core, Core™ 2 Duo and Quad, Xeon™, Itanium™, XScale™ or StrongARM™ microprocessor available from Intel Corporation of Santa Clara, Calif. Processor 701 is configured to execute instructions for performing the operations and steps discussed herein.

Chipset 702 may include memory control hub (MCH) 710 and input output control hub (ICH) 711. MCH 710 may include a memory controller (not shown) that communicates with a memory 705. MCH 710 may also include a graphics interface that communicates with graphics device 712. In one embodiment of the invention, the graphics interface may communicate with graphics device 712 via an accelerated graphics port (AGP), a peripheral component interconnect (PCI) express bus, or other types of interconnects. ICH 711 may provide an interface to I/O devices such as devices 703-704. Any of devices 703-704 may be a storage device (e.g., a hard drive, flash memory device), universal serial bus (USB) port(s), a keyboard, a mouse, parallel port(s), serial port(s), a printer, a network interface (wired or wireless), a wireless transceiver (e.g., WiFi, Bluetooth, or cellular transceiver), a media device (e.g., audio/video codec or controller), a bus bridge (e.g., a PCI-PCI bridge), or other devices.

Figure 8:
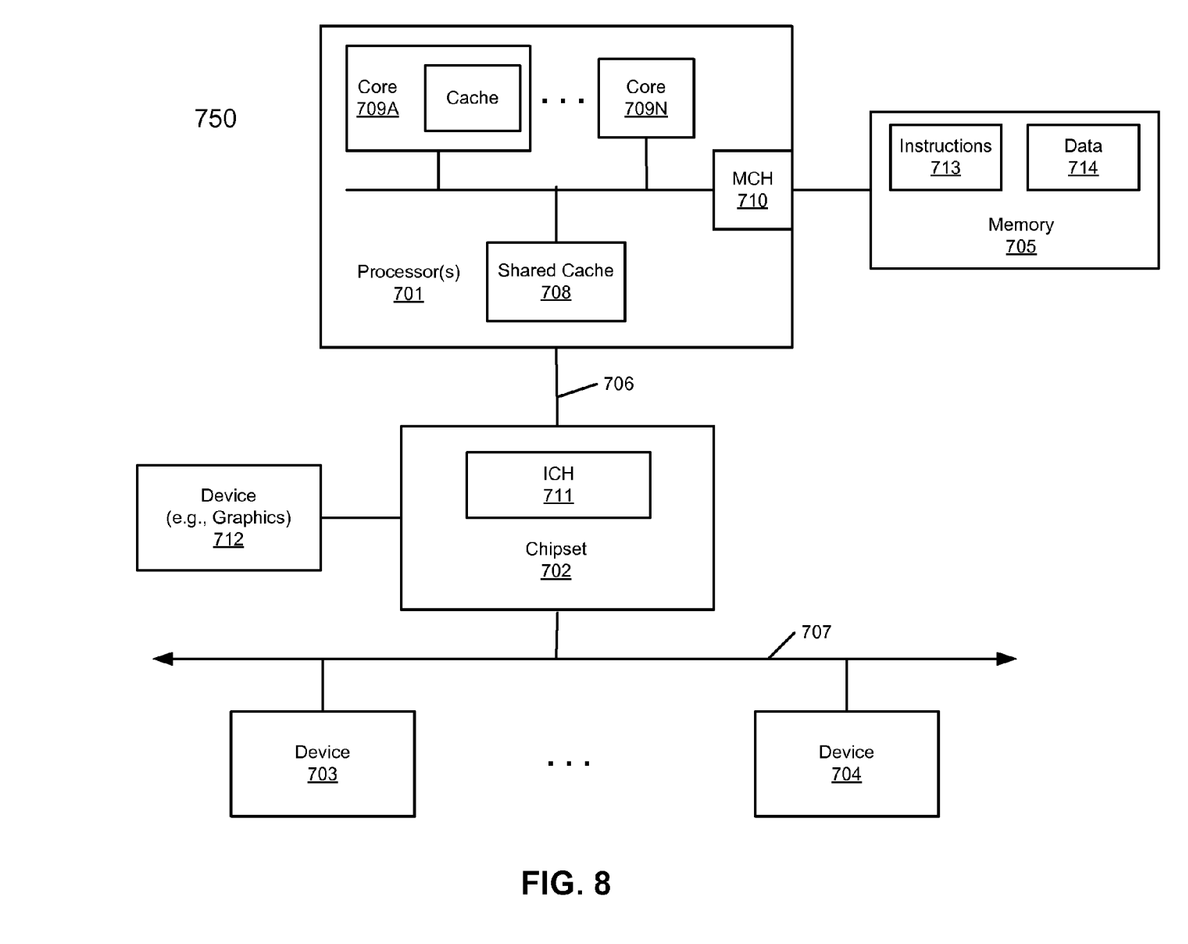
FIG. 8 is a block diagram illustrating an example of a data processing system according to another embodiment.

MCH 710 is sometimes referred to as a Northbridge and ICH 711 is sometimes referred to as a Southbridge, although some people make a technical distinction between them. As used herein, the terms MCH, ICH, Northbridge and Southbridge are intended to be interpreted broadly to cover various chips who functions include passing interrupt signals toward a processor. In some embodiments, MCH 710 may be integrated with processor 701. In such a configuration, chipset 702 operates as an interface chip performing some functions of MCH 710 and ICH 711, as shown in FIG. 8. Furthermore, graphics accelerator 712 may be integrated within MCH 710 or processor 701.

Memory 705 may store data including sequences of instructions that are executed by processor 701, or any other device. For example, executable code and/or data of a variety of operating systems, device drivers, firmware (e.g., input output basic system or BIOS), and/or applications can be loaded in memory 705 and executed by processor 701. An operating system can be any kind of operating systems, such as, for example, Windows® operating system from Microsoft®, Mac OS®/iOS® from Apple, Android® from Google®, Linux®, Unix®, or other real-time operating systems. In one embodiment, memory 705 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk or a flash storage device. Front side bus (FSB) 706 may be a multi-drop or point-to-point interconnect. The term FSB is intended to cover various types of interconnects to processor 701. Chipset 702 may communicate with other devices such as devices 703-704 via point-to-point interfaces.

Cache 708 may be any kind of processor cache, such as level-1 (L1) cache, L2 cache, L3 cache, L4 cache, last-level cache (LLC), or a combination thereof. Cache 708 may be shared with processor cores 709 of processor 701. Cache 708 may be embedded within processor 701 and/or external to processor 701. Processor 701 may further include a direct cache access (DCA) logic to enable other devices such as devices 703-704 to directly access cache 708. Processor 701 and/or chipset 702 may further include an interrupt controller to handle interrupts such as message signaled interrupts.

Processor 701 may further include one or more register files including, but are not limited to, integer registers, floating point registers, vector or extended registers, status registers, and an instruction pointer register, etc. The term "registers" is used herein to refer to the on-board processor storage locations that are used as part of macro-instructions to identify operands. In other words, the registers referred to herein are those that are visible from the outside of the processor (from a programmer's perspective). However, the registers should not be limited in meaning to a particular type of circuit. Rather, a register need only be capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit or 64-bit integer data. A register file may contain extended multimedia SIMD registers (e.g., XMM) for packed data. Such registers may include 128 bits wide XMM registers and 256 bits wide registers (which may incorporate the XMM registers in their low order bits) relating to SSE2, SSE3, SSE4, GSSE, and beyond (referred to generically as "SSEx") technology to hold such packed data operands.

According to one embodiment, a portion of process cache 708 and/or memory 705 is utilized to allocate a memory block for at least one of devices 703-704 to store interrupt data. When a device wishes to request an MSI interrupt, the device issues a first posted write transaction to the memory block to store its interrupt data as part of interrupt data 112. The device then issues a second posted write transaction to a system defined address to request an MSI interrupt according to the MSI specification. These transactions are back-to-back transaction while the bus or interconnect is locked by the device. However, in other embodiments, the bus does not have to be locked as long as bus transactions are sent and observed by the processor in a correct order. Thereafter, an ISR associated with the device is invoked to service the MSI interrupt using the interrupt data retrieved from the memory block, without having to communicate with the device via an IO transaction, as described above.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), firmware or software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A processor, comprising:
    an interrupt controller to receive a messaged signaled interrupt (MSI) request from a device over a bus; and
    an execution unit coupled to the interrupt controller to execute an interrupt service routine (ISR) associated with the device, the execution unit to retrieve interrupt data from a predetermined memory location specifically allocated to the device and to service the MSI using the interrupt data, without having to obtain the interrupt data from device via an input output (IO) transaction.

2. The processor of claim 1, wherein the memory location is allocated from at least one of a cache memory associated with the execution unit and a system memory during initialization of the device.

3. The processor of claim 1, wherein the memory location is allocated from a processor cache associated with the execution unit, and wherein the interrupt data is stored in the memory location by the device via a direct cache access (DCA) transaction over the bus.

4. The processor of claim 1, wherein the interrupt data comprises data of a device register, a control and status register (CSR), a FIFO, and/or a queue of the device representing an operating state of the device, a power state of the device and/or a thermal state of the device.

5. The processor of claim 1, wherein the interrupt data comprises data of a register, a FIFO, and/or a queue of the device representing a device control data, an address of a filled data buffer, an address of available device data for processing and/or an address of an available buffer to be filled.

6. The processor of claim 1, wherein the interrupt data is stored in the memory location by a device via a first posted write transaction to the memory location, and wherein the MSI is requested by the device via a second posted write transaction to a predetermined address defined for MSI.

7. The processor of claim 6, wherein the second posted write transaction is issued immediately following the first posted write transaction while the bus is locked by the device.

8. A method, comprising:
    receiving, by an interrupt controller, a messaged signaled interrupt (MSI) request from a device over a bus; and
    in response to the MSI, invoking an interrupt service routine (ISR) associated with the device, including retrieving interrupt data from a predetermined memory location specifically allocated to the device and servicing the MSI using the interrupt data, without having to obtain the interrupt data from device via an input output (IO) transaction.

9. The method of claim 8, wherein the memory location is allocated from at least one of a cache memory associated with the execution unit and a system memory during initialization of the device.

10. The method of claim 8, wherein the memory location is allocated from a processor cache associated with the execution unit, and wherein the interrupt data is stored in the memory location by the device via a direct cache access (DCA) transaction over the bus.

11. The method of claim 8, wherein the interrupt data comprises data of a device register, a control and status register (CSR), a FIFO, and/or a queue of the device representing an operating state of the device, a power state of the device and/or a thermal state of the device.

12. The method of claim 8, wherein the interrupt data comprises data of a register, a FIFO, and/or a queue of the device representing a device control data, an address of a filled data buffer, an address of available device data for processing and/or an address of an available buffer to be filled.

13. The method of claim 8, wherein the interrupt data is stored in the memory location by a device via a first posted write transaction to the memory location, and wherein the MSI is requested by the device via a second posted write transaction to a predetermined address defined for MSI.

14. The method of claim 13, wherein the second posted write transaction is issued immediately following the first posted write transaction while the bus is locked by the device.

15. A system, comprising:
    a bus;
    a device coupled to the bus;
    an interrupt controller to receive a messaged signaled interrupt (MSI) request from the device over the bus; and
    a processor coupled to the interrupt controller to execute an interrupt service routine (ISR) associated with the device, the processor to retrieve interrupt data from a predetermined memory location specifically allocated to the device and to service the MSI using the interrupt data, without having to obtain the interrupt data from device via an input output (TO) transaction.

16. The system of claim 15, wherein the memory location is allocated from at least one of a cache memory associated with the execution unit and a system memory during initialization of the device.

17. The system of claim 15, wherein the memory location is allocated from a processor cache associated with the execution unit, and wherein the interrupt data is stored in the memory location by the device via a direct cache access (DCA) transaction over the bus.

18. The system of claim 15, wherein the interrupt data comprises data of a device register, a control and status register (CSR) of the device representing an operating state of the device, a power state of the device and/or a thermal state of the device.

19. The system of claim 15, wherein the interrupt data comprises data of a register, a FIFO, and/or a queue of the device representing a device control data, an address of a filled data buffer, an address of available device data for processing and/or an address of an available buffer to be filled.

20. The system of claim 15, wherein the interrupt data is stored in the memory location by a device via a first posted write transaction to the memory location, and wherein the MSI is requested by the device via a second posted write transaction to a predetermined address defined for MSI.

\* \* \* \* \*